United States Patent
Shaffer et al.

(10) Patent No.: US 11,212,966 B2
(45) Date of Patent: Jan. 4, 2022

(54) FLORAL AND PLANT BOUQUET ARRANGING FIXTURE

(71) Applicants: Curtis L Shaffer, Loxahatchee, FL (US); Lynda Shaffer, Loxahatchee, FL (US)

(72) Inventors: Curtis L Shaffer, Loxahatchee, FL (US); Lynda Shaffer, Loxahatchee, FL (US)

(*) Notice: Subject to any disclaimer, the term of this patent is extended or adjusted under 35 U.S.C. 154(b) by 93 days.

(21) Appl. No.: 16/855,044

(22) Filed: Apr. 22, 2020

(65) Prior Publication Data

US 2020/0245563 A1 Aug. 6, 2020

Related U.S. Application Data

(62) Division of application No. 15/747,939, filed on Jan. 26, 2018, now Pat. No. 10,674,676.

(51) Int. Cl.
*A01G 5/04* (2006.01)
*A47G 7/02* (2006.01)
*F16B 2/06* (2006.01)

(52) U.S. Cl.
CPC ............... *A01G 5/04* (2013.01); *A47G 7/02* (2013.01); *F16B 2/065* (2013.01)

(58) Field of Classification Search
CPC . A01G 5/04; A47G 7/02; A47G 7/041; A47G 7/044
See application file for complete search history.

(56) References Cited

U.S. PATENT DOCUMENTS

| | | | |
|---|---|---|---|
| 1,336,307 A * | 4/1920 | Loudon | A47G 7/041 248/140 |
| 2,003,986 A * | 6/1935 | Witthuhn | A01G 9/02 47/39 |
| 3,027,014 A | 3/1962 | Lindblom | |
| 3,711,048 A | 1/1973 | Thalenfeld | |
| 5,070,644 A | 12/1991 | Hasty | |
| 5,368,267 A | 11/1994 | Howard | |
| 5,450,690 A | 9/1995 | Elsea | |
| 5,456,046 A | 10/1995 | Vitalune | |
| 5,934,016 A | 8/1999 | Jones | |
| 6,168,125 B1 | 1/2001 | Winger | |
| 6,289,630 B1 * | 9/2001 | Hetze | A01G 5/06 47/41.01 |
| 7,802,763 B2 | 9/2010 | Faller | |
| 9,736,992 B1 | 8/2017 | Barry | |
| 10,021,999 B1 | 7/2018 | Khan | |
| 2002/0095863 A1 * | 7/2002 | Receveur | A47G 7/041 47/39 |
| 2003/0173483 A1 | 9/2003 | Yeh | |

(Continued)

*Primary Examiner* — Monica L Barlow (57) ABSTRACT

The invention relates to a reusable floral bouquet arranging fixture having a 3D substantially conic section frame, with apertures arranged thereon for the insertion of plant stems, such that the plant stems converge substantially to a common point; wherein the frame attaches to an adjustable support apparatus, including an associated spindle, and a bracket having a lower arm with a slotted portion that adjusts the location of the spindle, and an upper arm slotted portion that adjusts the location of a holding device, including a clamp that attaches to a base; and wherein said frame is removable for use at an event, as a gift, or as a household or business decoration.

18 Claims, 8 Drawing Sheets

(56) References Cited

U.S. PATENT DOCUMENTS

| | | | |
|---|---|---|---|
| 2007/0012855 A1 | 1/2007 | Rocavert | |
| 2008/0072486 A1* | 3/2008 | Castillo | A01G 5/04 47/41.13 |
| 2008/0308695 A1 | 12/2008 | Lambert | |
| 2009/0047801 A1* | 2/2009 | Low | H05H 7/00 439/50 |
| 2012/0047801 A1* | 3/2012 | Hogan | A01G 9/022 47/66.6 |
| 2016/0106043 A1 | 4/2016 | Eiler | |

\* cited by examiner

FLORAL AND PLANT BOUQUET ARRANGING FIXTURE

CROSS REFERENCE TO RELATED APPLICATION

This application claims priority under 35 U.S.C. § 1 19(e) of U.S. provisional patent application Ser. No. 62/208,955, filed Aug. 24, 2015, entitled Floral and Plant Arranging Form and Clamp Holder Apparatus and Method, the entire disclosure of which is hereby incorporated by reference. Further, this application claims priority to U.S. patent application Ser. No. 15/747,939 filed Jan. 26, 2018. The entire contents of the above applications are hereby incorporated by reference as though fully set forth herein.

FIELD OF INVENTION

This invention relates to hand-held floral bouquet arrangements and more specifically to a reusable floral arranging form and an adjustable device that reduces plant handling, and meets the ergonomic needs of a floral arranger.

BACKGROUND

The making of plant and flower bouquets requires skill in plant selection, assembly, and arrangement, and in the securing of stems to create a desired finished product. Oftentimes, careful, artful arranging of flowers and securing of stems requires two people to maintain shape and uniformity of the design as the bouquet is created, and to handle and maneuver the stems below the bouquet, when the design is completed. Although vase-covering grids allow for some hands-free use, they are static devices that must be used at a set tabletop height. Static floral arranging forms and devices require the floral arranger to pre-cut plant stems before arranging and securing the plants in their finished form. This can lead to wear, damage and waste of plants from over handling. This can also lead to waste if stems are prematurely cut too short simply to fit current devices. Static devices can also lead to user fatigue from standing or sitting in one position for too long in order to prepare a single or multiple bouquets. Florists also use an article that utilizes a material known as floral foam into which plants are inserted. One such article has at one end floral foam in substantially a spherical shape, and at the other end below the floral foam, a support and handle for holding the floral foam and is generally referred to as a floral foam form. Some floral foam is non-biodegradable, and in certain cases is manufactured from carcinogenic material, such as carbon black and formaldehyde. In addition to the environmental drawbacks, floral foam forms are inconvenient and clumsy to use, requiring the floral arranger to hold the handle for long periods while designing a bouquet or having to place the form on a table top or work bench for a variety of reasons, such as user fatigue and plant selection. Placing a partially completed arrangement on a table can cause premature bruising or even death of fragile flowers. Professional florists or hobbyists who use floral foam forms for creating bouquets would benefit from an invention that does not have the drawbacks typically present in static bouquet arranging devices or those that use floral foam, and that also provides a safe and ecologically friendly method for creating uniformly shaped bouquet designs of varying outlines and sizes, without the need or assistance of others, avoids unnecessary cutting, handling and waste of plants during assembly, and is adjustable to varying heights and depths to provide ergonomic comfort to the floral arranger.

One bouquet assembly device, U.S. Pat. No. 4,964,237 discloses a work holder and means for supporting the work holder in a cantilever fashion. One drawback is that the apparatus is not adjustable in height or depth once fixed in place on a tabletop. Additionally, a fixed distance exists between the work holder and the apparatus base requiring cutting of plants prior to arrangement and assembly.

Another device, U.S. Pat. No. 5,127,184 discloses the combination of a stationary floral foam based holder for receiving plants together with a removable guide wire frame, through which, cut plants are passed and inserted, stem first, into the floral foam, such that the stems do not extend substantially beyond the area defined by the guide wires. Once the floral foam is filled with plants, the guide may be removed. A drawback is that the apparatus is not adjustable in height or depth once fixed in place on a tabletop. This device also requires pre-cutting of plants prior to arrangement and assembly and may also necessitate multiple cuts to plants as they are arranged within the foam form. Also, the open wire frame does not guarantee uniformity in shape or design of the final product, if these are important considerations. Each of these devices requires use of a floral foam holder, vase, pot or other container to hold the plants while they are arranged.

SUMMARY OF THE INVENTION

This invention relates to a bouquet arranging and design system having a reusable floral fixture that is inexpensive to manufacture and that adjusts in height and/or depth for user comfort. The invention also increases production efficiency, by reducing plant waste or damage and aids a floral arranger in creating floral bouquets, without assistance from others.

More particularly, the invention pertains to a reusable apparatus for arranging a floral bouquet including, a frame, having a three-dimensional ("3D") substantially conic section, such as by way of example, a 3D parabolic shape (a solid surface generated by the rotation of a parabola around its axis of symmetry) or a 3D hemispherical shape (a solid surface generated by the rotation of a circle around its axis of symmetry), (hereafter each simply referred to as parabolic shape or hemispherical shape, respectively), with apertures arranged thereon for the insertion of plant stems, such that plant stems converge substantially at a common point; said frame attaching to an adjustable support apparatus, including an associated spindle, and a bracket having a lower arm with a slotted portion that adjusts the location of the spindle, and an upper arm slotted portion that adjusts the location of a holding device, for example, a clamp that attaches to a base, by way of example, a base plate, a desk, work table, workbench or shelf; and wherein said frame is removable for use by way of example and not limitation, at an event, as a gift, or as a household or business decoration.

In another non-limiting embodiment, the frame may be manufactured in a variety of configurations to create bouquets of varying sizes and shapes, such as geometric shapes, e.g., parabolas, circles, ellipses, crosses or fanciful designs, such as stars, hearts, animals, or figures inspired by hobbies, sports or movies. In one embodiment, the initial frame shape undergoes a manufacturing process of changing the initial two-dimensional shape into a three-dimensional shape. For example, a two-dimensional circular frame transforms into a three-dimensional frame, such as the substantially parabolic shape. Other two-dimensional shapes are similarly transformed into three-dimensional designs that increase the number of possible floral arrangements.

In one non-limiting embodiment of the invention, the frame as shaped in substantially the parabolic section, causes the plant stems that are inserted through frame apertures, to self-orient to a point below the frame where, as more stems are added and the circumference around the stems increases, the stems converge to a vertex. It has been determined that a parabolic, hemispherical or half-dome frame shape meets the requirements for minimizing plant stem breakage and achieving a desirable aesthetic, by directing the stems to a common point so they are more easily secured or bound by a floral arranger.

In another embodiment, the apertures include a combination of one or more of, size, shape, separation, and coding, e.g., notches, colors, letters, words or numbers, which, when used in combination with pictures, videos, written or other modes of instruction, provides a method for achieving a desired bouquet design. Alternatively, such coding may appear on the frame surface or in combination with aperture coding. By way of example, and not limitation, a section of the frame may display the color red to indicate to the floral arranger that red plants should be inserted in apertures within the red-colored section, while within the red colored section, the letters "R" and "C", respectively, displayed in proximity to or within an aperture, indicates to the floral arranger that a pink rose should be inserted through the "R" aperture and a white carnation, should be inserted through the "C" aperture.

The shapes, configuration and separation of the apertures in alternative embodiments may be modified in a variety of ways to facilitate the formation of different shaped bouquets. For example, circular, elliptical, oval, or polygonal shaped apertures and/or the angle or the separations of the apertures could be modified for additional space between plants and the angle at which the plants rest in the frame, to create a different aesthetic in a completed floral bouquet.

In an alternate embodiment, the invention includes a frame, joined to an adjustable support apparatus in the place of the spindle and bracket, and includes one or more telescoping shafts, joined to a holding device that includes an associated support shaft and base, wherein said frame is removable for use.

In yet another embodiment of the invention, a floral arranging device, by way of example, a floral foam form, is used in combination with an adapter block, said adapter block having a first channel for receiving and securely holding a floral foam form handle, said adapter block joined to an adjustable support apparatus having an associated first support shaft, joined to a holding device having a second shaft connected to a base; wherein the floral foam form is removable for use.

DETAILED DESCRIPTION OF THE INVENTION

The following detailed description includes the best mode of carrying out the invention and is made for the purpose of illustrating the general principles of the invention and should not be taken in a limiting sense. The scope of the invention is determined by reference to the claims. Each part or function is assigned a reference number, wherever that part is shown in the figures.

Figure 1:
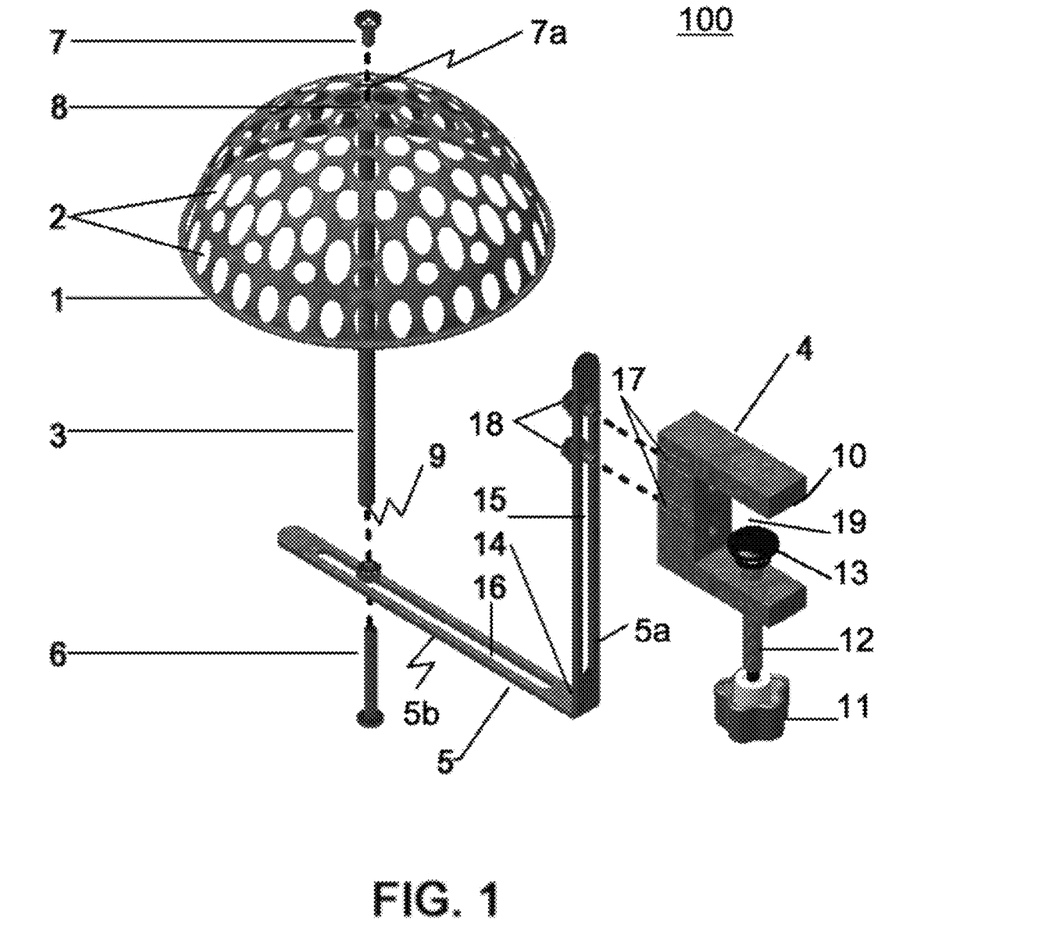
FIG. 1 is a perspective view of a shaped frame with bracket and holding device in accordance with an embodiment of the invention.

As illustrated in FIG. 1, the apparatus 100 includes a frame 1 connected to a spindle shaft 3, which spindle shaft is connected to a bracket 5, and which bracket 5, is connected to a clamp 4. The bracket 5 includes an upper arm 5a and substantially perpendicular thereto, a lower arm Sb, each with a slot 15 and 16, respectively, along a portion of the length of each arm. A fastener 7, inserts, through the frame center hole 7a, into the spindle shaft 3 through a female connection. At the opposing end 9 of spindle shaft 3, the spindle shaft is attached to a bracket 5, by a fastener 6 inserted through the slot 16, through the bracket lower arm Sb. Slot 16 also allows for depth wise adjustment, either forward toward the floral arranger, or backward away from the floral arranger. The clamp 4 also includes a fastener 18 for attaching the clamp 4 to the bracket upper arm Sa through slot 15 that allows for height wise adjustment of the frame 1 and bracket 5. The clamp 4 also includes an opening 19 for fixing the clamp to a base (not shown). Adjustment knob 11, screw shaft 12, and foot 13 tightens the clamp 4 to a base.

One or more of the apparatus 100 components may be plastic or metal, however, alternative materials could be utilized including recyclable or biodegradable materials, geo-plastics, rubber, metal, wood, wire, paper, plant or tree bulk or other material that will support the weight of plants when the stems are passed through the apertures 2.

The apparatus 100 may be constructed through a variety of processes and techniques, such as injection molding, thermoforming, 3D printing, additive manufacturing, metal forming, as well as utilizing adhesives, mating parts or other means of joining or molding materials, which, by way of example and not limitation, may replace the necessity of the fastener 7. Such processes and techniques are well-known to those skilled in the art of manufacturing and assembling two-dimensional and three-dimensional shaped fixtures constructed from metals, plastics and recyclable materials.

The horizontal adjustment feature, as illustrated in FIG. 1, includes the horizontal slot 16 in bracket 5. The spindle shaft 3 is fastened within the horizontal slotted area 16 by means of fastener 6. The fastener 6 can be partially loosened to slide horizontally toward or away from the clamp 4, and the fastener 6 can be tightened to secure the spindle 3, once the desired horizontal work position is obtained. It should be noted that fastener 6 could be substituted with a variety of other fasteners for example and not limitation, thumb knobs or quick release tightening methods, while accomplishing the same general purpose of the invention.

With further reference to FIG. 1, spindle shaft 3 may also be assembled from cooperating telescoping removable shafts to adjust the distance between the top of the frame 1 and the bracket 5.

FIG. 1 illustrates a clamp 4 having tightening knob 11 with threaded shaft 12 and foot 13, which are used together after inserting a base, such as a table edge, into the void 19, between foot 13 and the underside of clamp arm 10. Clamp 4 is attached to bracket 5 through slot 15, by means of a pair of fasteners 18 inserted through slot 15 into the clamp 4 into a pair of tapped holes 17, which serve to attach the bracket 5 to clamp 4. The attachment of the bracket 5 to clamp 4 provides for vertical adjustment of clamp 4 along slot 15 to a desired working elevation. As shown in FIG. 1, the upper arm Sa and lower arm Sb are situated at substantially a 90-degree angle 14 to one another.

Figure 2A:
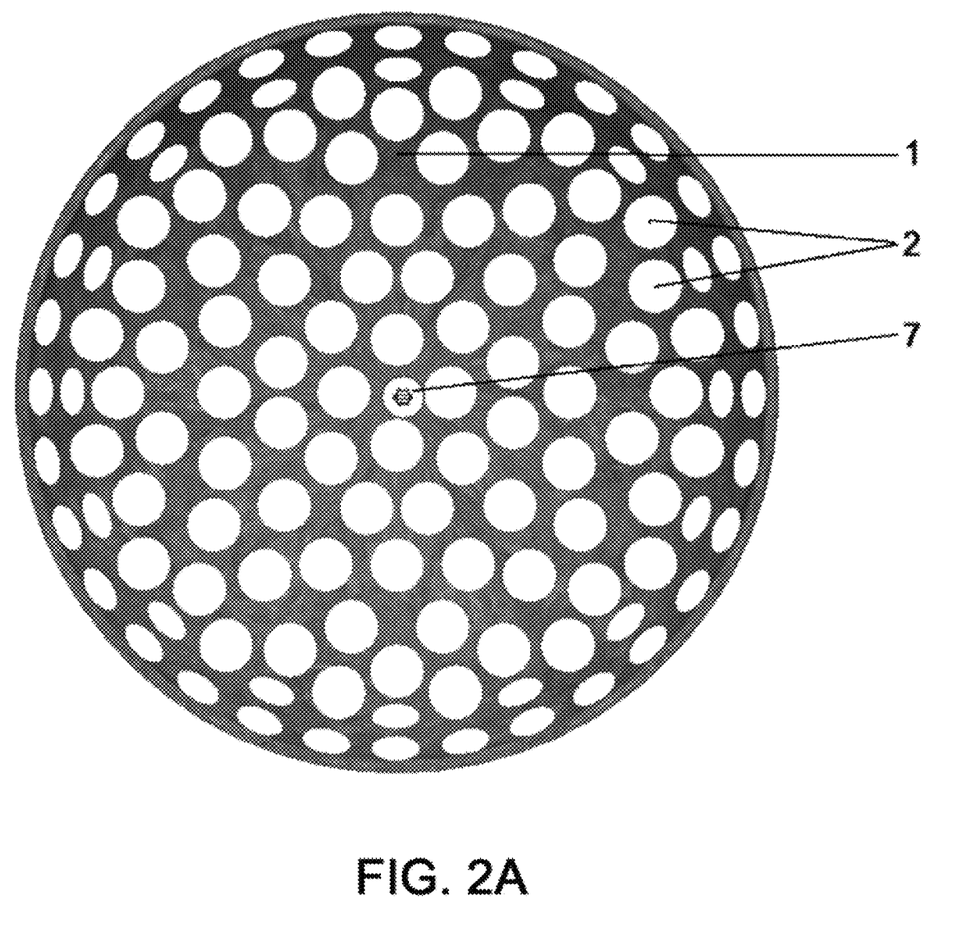
FIG. 2A is a top view of a shaped frame showing the location and distribution of apertures in accordance with an embodiment of the invention.
Figure 2B:
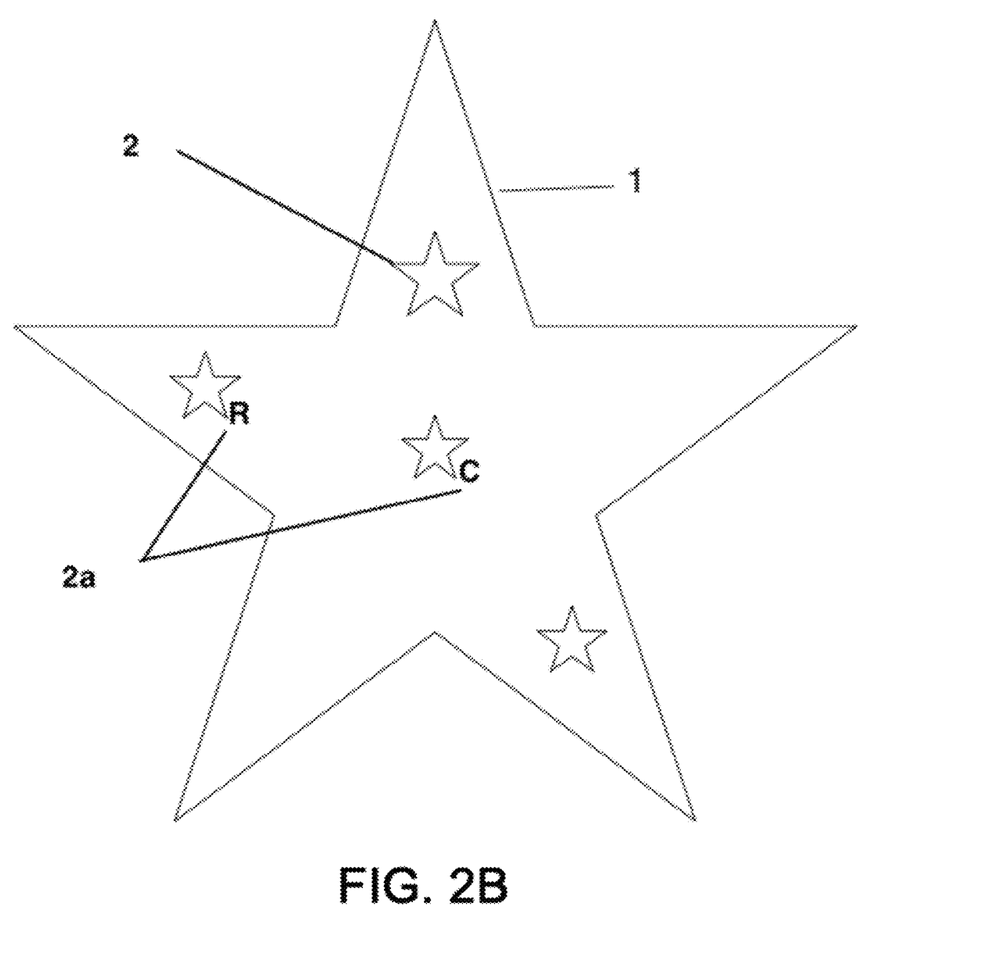
FIG. 2B is a top view of an alternate embodiment of frame and aperture shape, with coding.
Figure 3:
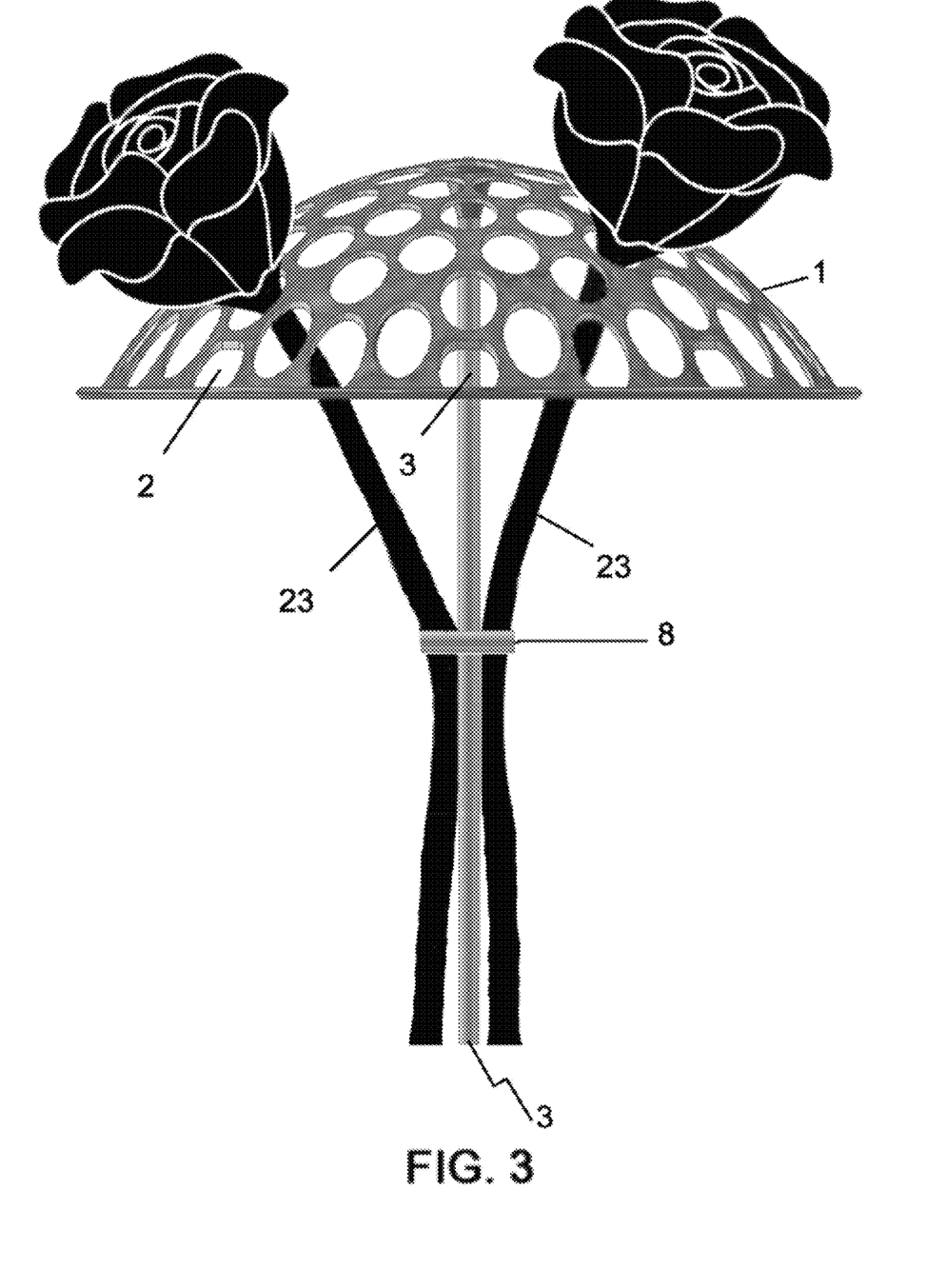
FIG. 3 is a perspective view of a shaped frame with flowers inserted through two of the several apertures in accordance with an embodiment of the invention.

As shown in FIG. 2A, FIG. 2B and FIG. 3, the surface of the frame I includes the plurality of apertures 2 that receive plant stems (see, FIG. 3, 23). With reference to FIG. 2A, the apertures 2, on the surface of the frame 1 are arranged in a pattern that optimizes the quantity and position of plants 26 and stems 23, above and below the frame 1, respectively, to achieve the desired shape of the finished bouquet arrangement. In one non-limiting embodiment of the invention as illustrated in FIG. 2A, the apertures 2 are substantially circular in shape. The shape and size of the frame 1, and the optimal shape, size, and orientation of the apertures 2, will vary depending upon the desired size and shape of the finished floral arrangement. In another embodiment, the apertures and/or the frame are coded which, when used in combination with pictures, video, written or other mode of instruction, provides a method for achieving a desired bouquet design.

As illustrated in FIG. 2B, the frame may be manufactured in a variety of configurations to create bouquets of varying sizes and shapes, such as geometric shapes, e.g., parabolas, circles, ellipses, crosses or fanciful designs, such as stars, hearts, animals, or figures inspired by hobbies, sports or movies. The size, shape and separation of apertures are variable and independent of a frame configuration. By way of example, a star shaped frame 1, may have star shaped apertures 2 as illustrated in FIG. 2B, or other aperture shapes depending on the desired bouquet design. FIG. 2B also illustrates the use of codes 2a on the surface of the frame 1 which may be used by a floral arranger to achieve a desired bouquet design.

With reference to FIG. 3, after filling the frame 1 with plants, but before removing the frame 1 from the bracket, a floral arranger may secure the stems 23 by one or more means 8, such as tape or fabric or any other suitable and durable method for securing stems. Thereafter, frame 1 and spindle shaft 3 may be detached from the bracket 5 by removing fastener 6 from the lower arm 5b, thereby avoiding unnecessary contact with the plants inserted into the frame 1. In an alternate embodiment, the spindle shaft 3 may be detached from bracket 5 by sliding the spindle shaft 3 upward separating the shaft from the bracket. Once the frame is released, the stems may be placed in water or other liquid to maintain freshness.

Figure 4A:
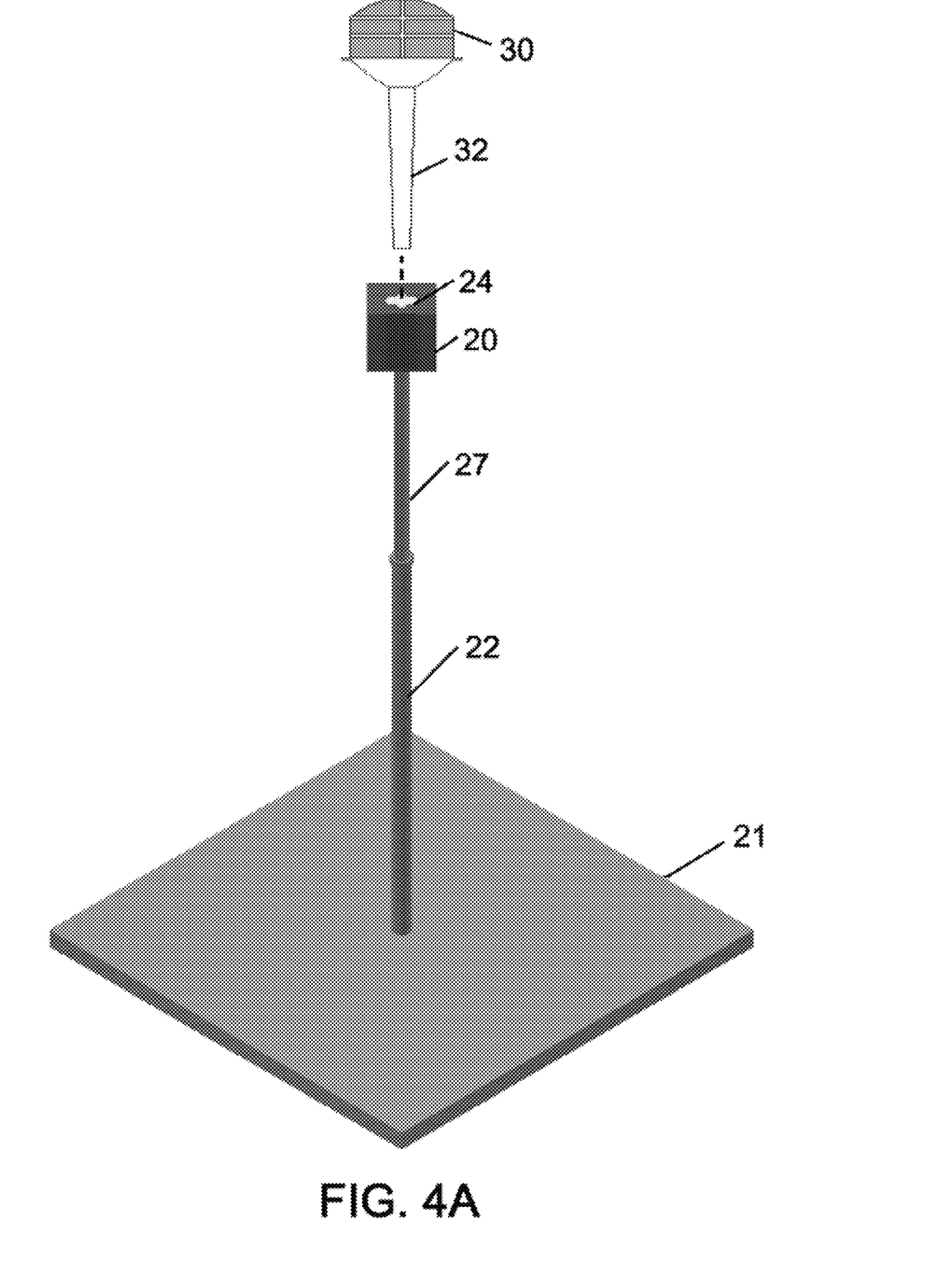
FIG. 4A is a plan view of a floral foam form, an adapter, shafts, and a base in accordance with an embodiment of the invention.
Figure 4B:
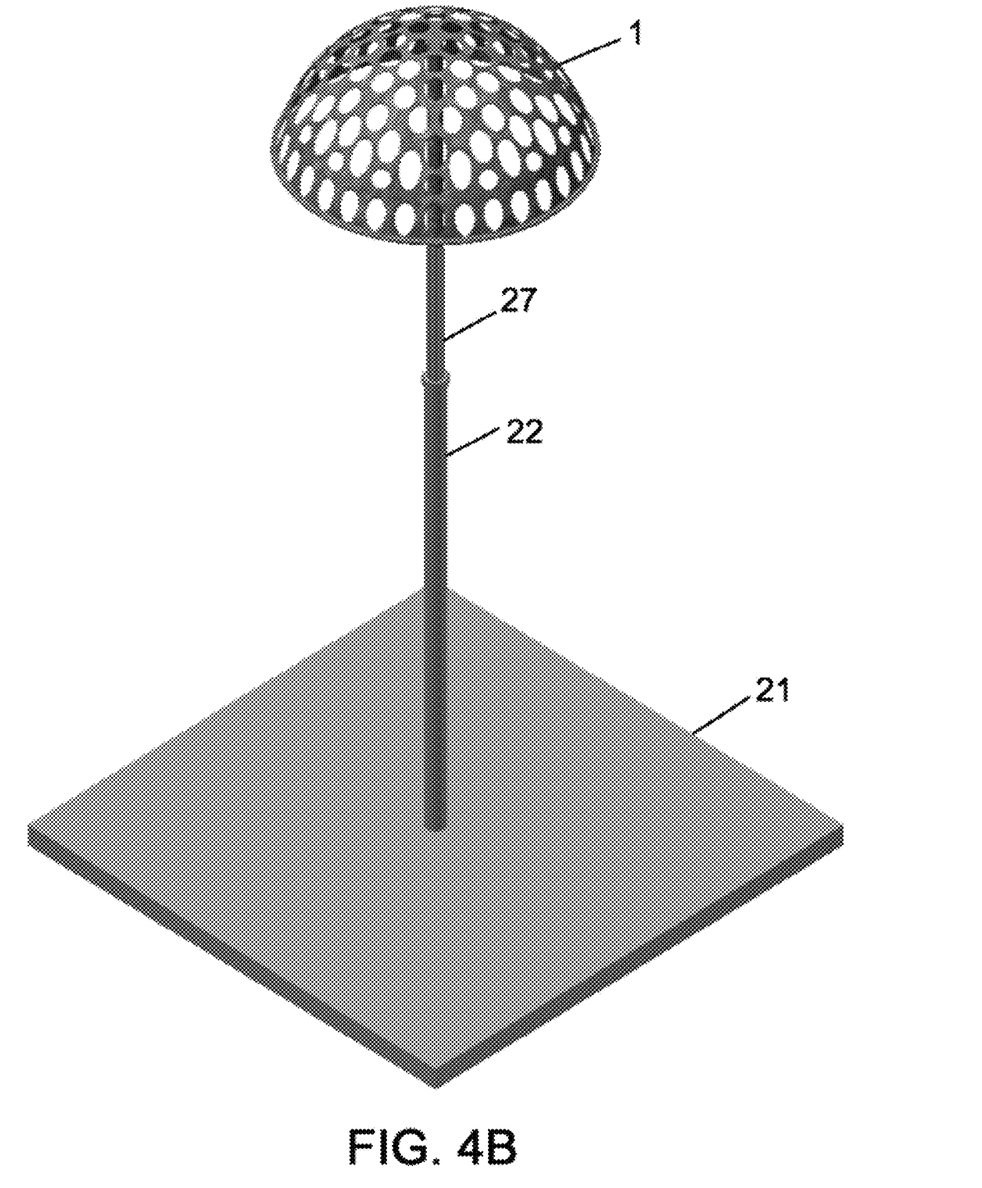
FIG. 4B is a plan view of the frame, shafts and base in accordance with an embodiment of the invention.
Figure 5A:
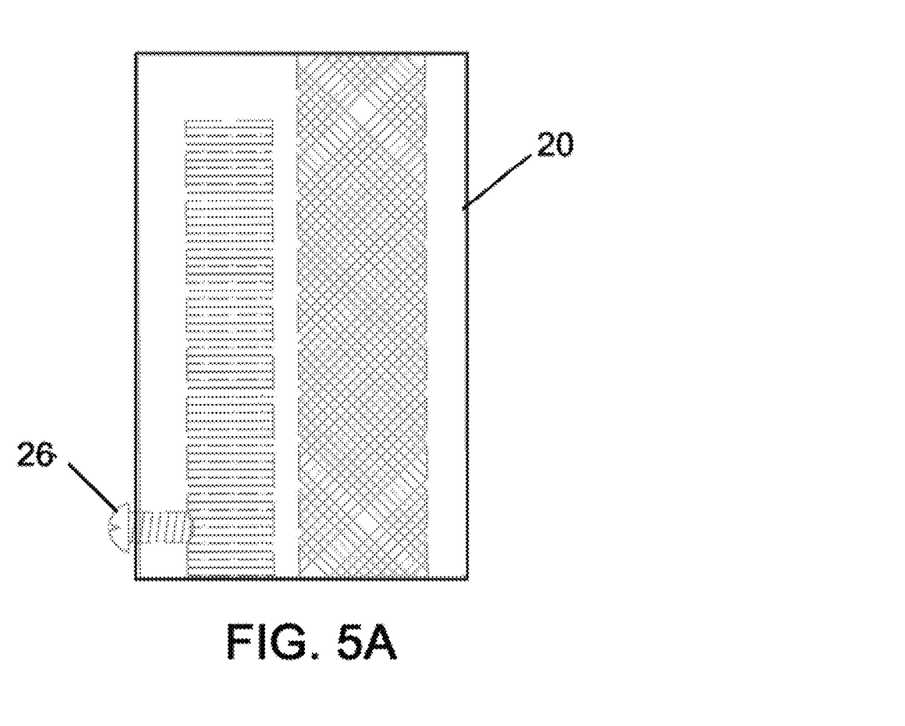
FIG. 5A is a side view of the adapter block in accordance with an embodiment of the invention.
Figure 5B:
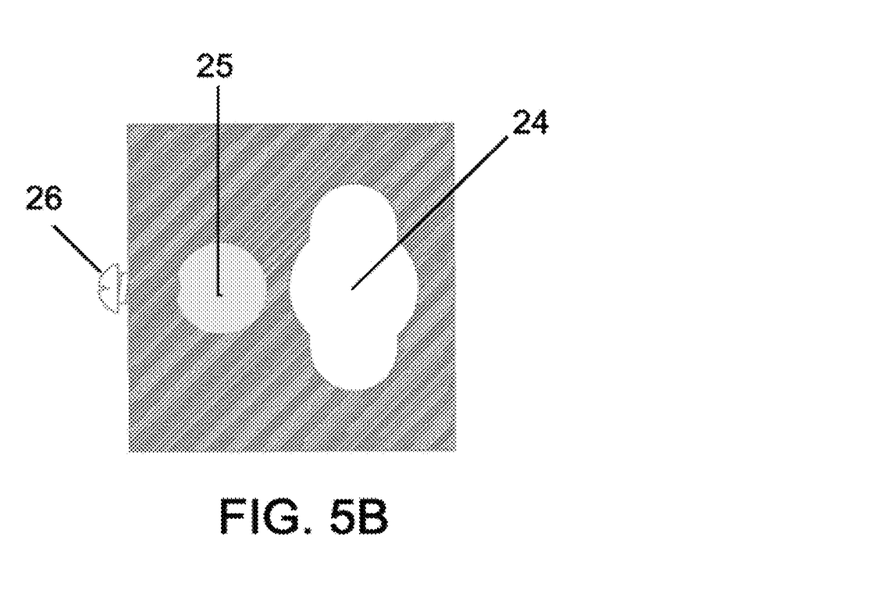
FIG. 5B is a top view of the adapter block in accordance with an embodiment of the invention.

The apparatuses shown in FIG. 4A, and FIG. 4B are stand-alone fixtures, that may be used in place of the bracket 5, and clamp 4. Each configuration includes a base 21 and a center hollow first support shaft 22. The shaft may be assembled from two cooperating telescoping removable shafts 22, 27 to adjust its height. In one non-limiting embodiment of the invention with a stand-alone fixture, as illustrated in FIG. 4A, an adapter block 20, by way of example and not limitation, is formed substantially in the shape of a cube. The block 20, has an opening 24 on the top side for receiving the handle of a floral arranging device having a handle, by way of example and not limitation a floral foam form 30 as well as the second support shaft 27 joined to the underside of the adapter block 20. The base 21, with center hollow support shaft 22 extending upward from the top side of the base 21, for receiving and securely holding shaft 23.

FIG. 4B shows the stand-alone fixture utilizing the frame 1 joined to first support shaft 27 and the base 21. In an alternative embodiment, the spindle 3 (see, FIG. 1) may be used in place of the support shaft 27.

Referring to FIG. SA, FIG. SB, block 20 has a first channel 24 that extends through the block 20. First channel 24 is a receiving channel of a depth and diameter and shape to accept and securely hold a variety of floral arranging devices, for example, a generally spherical floral foam form composed of a penetrable structure, where flower stems are inserted (see, FIG. 4A, 30). The floral foam form serves the floral retaining function of the frame 1 (see, FIG. 1), and hereinafter either element is referred to as a frame. The adapter block 20 has a second channel 25 parallel to the first channel 24, and is of a depth and diameter to securely accept and hold a shaft 27 (see, FIG. 4A) or alternatively the spindle 3 (see, FIG. 1, 3). Moving in a direction away from channel 25, is a threaded hole 26, into which a fastener, for example a set screw, may be used to connect with channel 25, to lock the adapter to a shaft 27 (see, FIG. 4A) or alternatively the spindle 3 (see, FIG. 1, 3).

Figure 6:
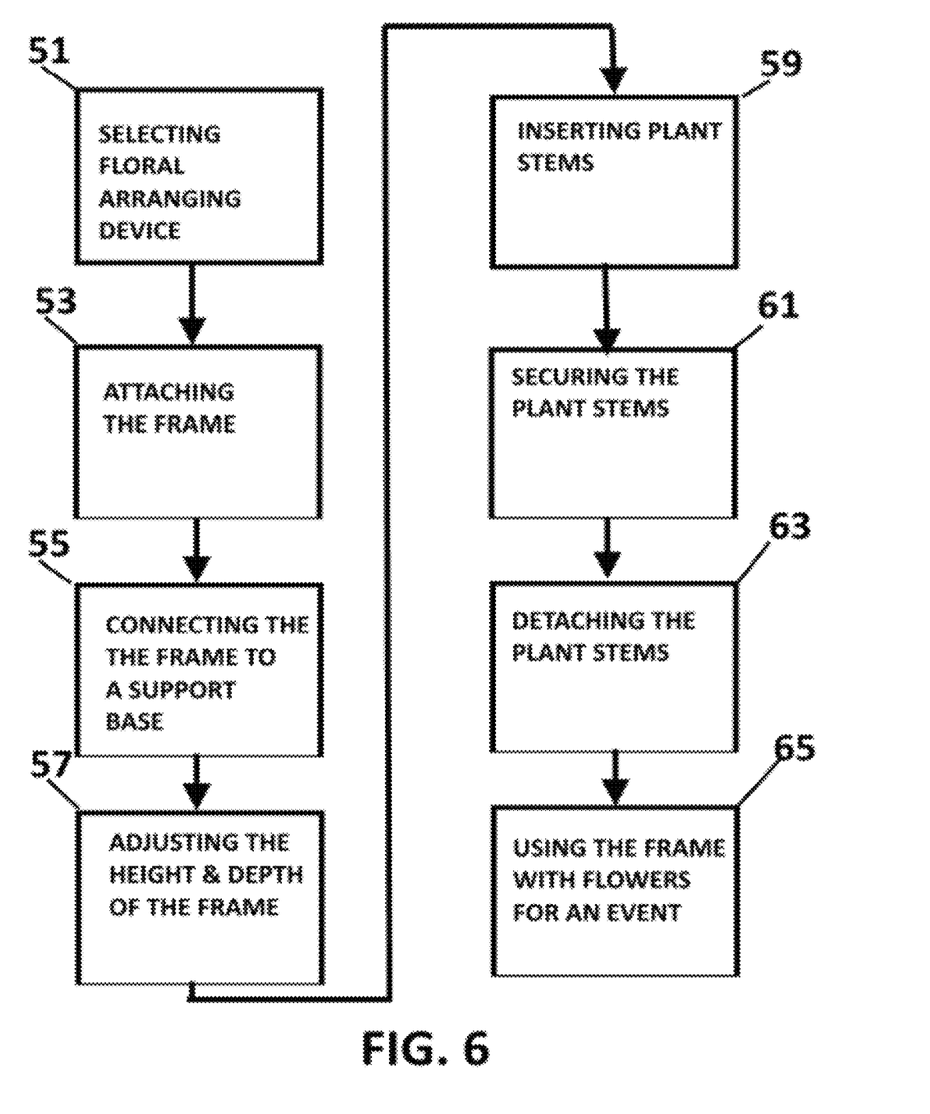
FIG. 6 is a flow chart of a method of use in accordance with an embodiment of the invention.

FIG. 6, illustrates a method of arranging plants comprising the steps of selecting 51 a floral arranging device from one of a 3D substantially conic section frame, having thereon one of apertures, or a floral form, for the insertion of plant stems; attaching 53 the frame to a support apparatus, having one or more of a first support shaft, a second support shaft, or a spindle, a bracket and a holding device; connecting 55 the frame and support apparatus to a base; adjusting 57 the height and depth of the frame relative to a flower arranger; inserting 59 the plant stems into one of, the frame apertures or floral form; securing 61 the plant stems at a common point; detaching 63 the frame and support apparatus from the base; and removing 65 the frame for use.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A reusable apparatus for arranging a floral bouquet comprising:
   a frame, having a 3D substantially conic section shape for the insertion of plant stems, such that plant stems converge substantially at a common point;
   said frame joined to an adjustable support apparatus, the support apparatus includes an associated first support shaft, joined to a second support shaft; wherein the second shaft is connected to a base;
   an adaptor block, the adapter block including an opening on a top side of the adapter block for receiving the frame and an opening on an underside of the adaptor block;
   wherein the adapter block further comprises:
   a first channel, wherein the first channel extends through the adapter block and is configured with a depth, diameter and shape to securely hold the frame; and
   a second channel, wherein the second channel is configured with a depth and diameter to securely hold the first support staff; wherein the first and second channels are parallel to each other; and
   wherein said frame is removable for use.

2. The apparatus in claim 1, wherein frame insertion openings are perpendicular to the plane of the frame.

3. The apparatus in claim 1, wherein the frame is coded with one or more of:
   notches, numbers, letters, words, colors.

4. The apparatus in claim 1, wherein frame insertion openings are coded with one or more of: notches, numbers, letters, words, colors.

5. The apparatus in claim 1, wherein frame insertion openings are in the shape of one or more of: circles, ellipses, ovals, polygons.

6. The apparatus in claim 1, wherein one or more of the frame, first support shaft, and second support shaft are formed by injection molding, thermoforming, 3D printing, additive manufacturing, or metal forming manufacturing.

7. The apparatus in claim 1, wherein the first shaft and second shaft are cooperating telescoping shafts.

8. A method of arranging flowers using the apparatus of claim 1 comprising:
   (i) selecting the floral arranging apparatus frame having a 3D substantially conic section shape for the insertion of plant stems;
   (ii) attaching the frame to the support apparatus;
   (iii) connecting the frame and support apparatus to a base;
   (iv) adjusting the height and depth of the frame;
   (v) inserting the plant stems into frame insertion openings;
   (vi) securing the plant stems at a common point;
   (vii) detaching the frame and support apparatus from the base;
   (viii) removing the frame for use.

9. A reusable apparatus for arranging a floral bouquet comprising:
   a frame, having a substantially parabolic shape or hemispherical shape with apertures arranged thereon for the insertion of plant stems, such that plant stems converge substantially at a common point;
   said frame attached to an adjustable support apparatus, the support apparatus includes an associated first support shaft, joined to a second support shaft;
   wherein the second shaft is connected to a base;
   an adaptor block, the adapter block including an opening on a top side of the adapter block for receiving the frame and an opening on an underside of the adaptor block;
   wherein the adapter block further comprises:
   a first channel, wherein the first channel extends through the adapter block and is configured with a depth, diameter and shape to securely hold the frame; and
   a second channel, wherein the second channel is configured with a depth and diameter to securely hold the first support staff; wherein the first and second channels are parallel to each other; and
   wherein said frame is removable for use.

10. The apparatus in claim 9, wherein the frame apertures are perpendicular to the plane of the frame.

11. The apparatus in claim 9, wherein the frame is coded with one or more of: notches, numbers, letters, words, colors.

12. The apparatus in claim 9, wherein the apertures are coded with one or more of: notches, numbers, letters, words, colors.

13. The apparatus in claim 9, wherein the apertures are in the shape of one or more of: circles, ellipses, ovals, polygons.

14. The apparatus in claim 9, wherein one or more of the frame, first support shaft, and second support shaft are formed by injection molding, thermoforming, 3D printing, additive manufacturing, or metal forming manufacturing.

15. The apparatus in claim 9, wherein the first support shaft and second support shaft are cooperating telescoping shafts.

16. A reusable apparatus for arranging a floral bouquet comprising:
   a floral arranging device with a handle, the floral arranging device configured for the insertion of floral arrangement components into the device;
   an adaptor block, the adapter block including an opening on a top side of the adapter block for receiving the handle and an opening on an underside of the adaptor block;
   a first support staff joined to the underside of the adaptor block through the opening on the underside of the adapter block;
   a second support staff connected to the first support staff;
   a base, wherein the second support staff is connected to the base and the second support staff extends upward from the base and connects with the first support staff;
   wherein the adapter block further comprises:
   a first channel, wherein the first channel extends through the adapter block and is configured with a depth, diameter and shape to securely hold the frame; and
   a second channel, wherein the second channel is configured with a depth and diameter to securely hold the first support staff; wherein the first and second channels are parallel to each other; and
   wherein the floral arranging device is removable for use.

17. The apparatus in claim 16, wherein the first support shaft and second support shaft are cooperating telescoping shafts.

18. The apparatus in claim 16, wherein one or more of the floral arranging device, first support shaft, and second support shaft are formed by injection molding, thermoforming, 3D printing, additive manufacturing, or metal forming manufacturing.

* * * * *